United States Patent

Saunders et al.

[15] 3,651,578
[45] Mar. 28, 1972

[54] BOW CHECKING AND CALIBRATING DEVICE

[72] Inventors: Thomas Allen Saunders, 2223 25th St.; Charles A. Saunders, 313 Morton Road, both of Columbus, Nebr. 68601

[22] Filed: Feb. 2, 1970

[21] Appl. No.: 7,888

[52] U.S. Cl. ................................................33/180 R, 33/46 A
[51] Int. Cl. ........................................................G01b 3/38
[58] Field of Search ................................33/180 R, 46 A

[56] References Cited

UNITED STATES PATENTS

| | | | |
|---|---|---|---|
| 3,088,212 | 5/1963 | Smith | 33/180 R |
| 3,111,772 | 11/1963 | Hartog | 33/180 R |
| 3,038,262 | 6/1962 | Fuehrer et al. | 33/180 R |

*Primary Examiner*—William D. Martin, Jr.
*Attorney*—Kegan, Kegan & Berkman

[57] ABSTRACT

A bow square for checking and recording the bracing height, nocking point, and locations for a kisser and peep sight of an archery bow. The device comprises an elongated plate provided with a graduated scale for measuring the bracing height, and a cross bar extending transversely of the elongated plate and having a scale extending parallel to the bowstring. A pointer mounted on a slidable bar may be moved along the scale on the cross bar to indicate the nocking point and the correct locations of the kisser, and peep sight. Marking receiving means are provided parallel to each scale for recording the correct locations and adjustments.

5 Claims, 14 Drawing Figures

Patented March 28, 1972
3,651,578
2 Sheets-Sheet 1
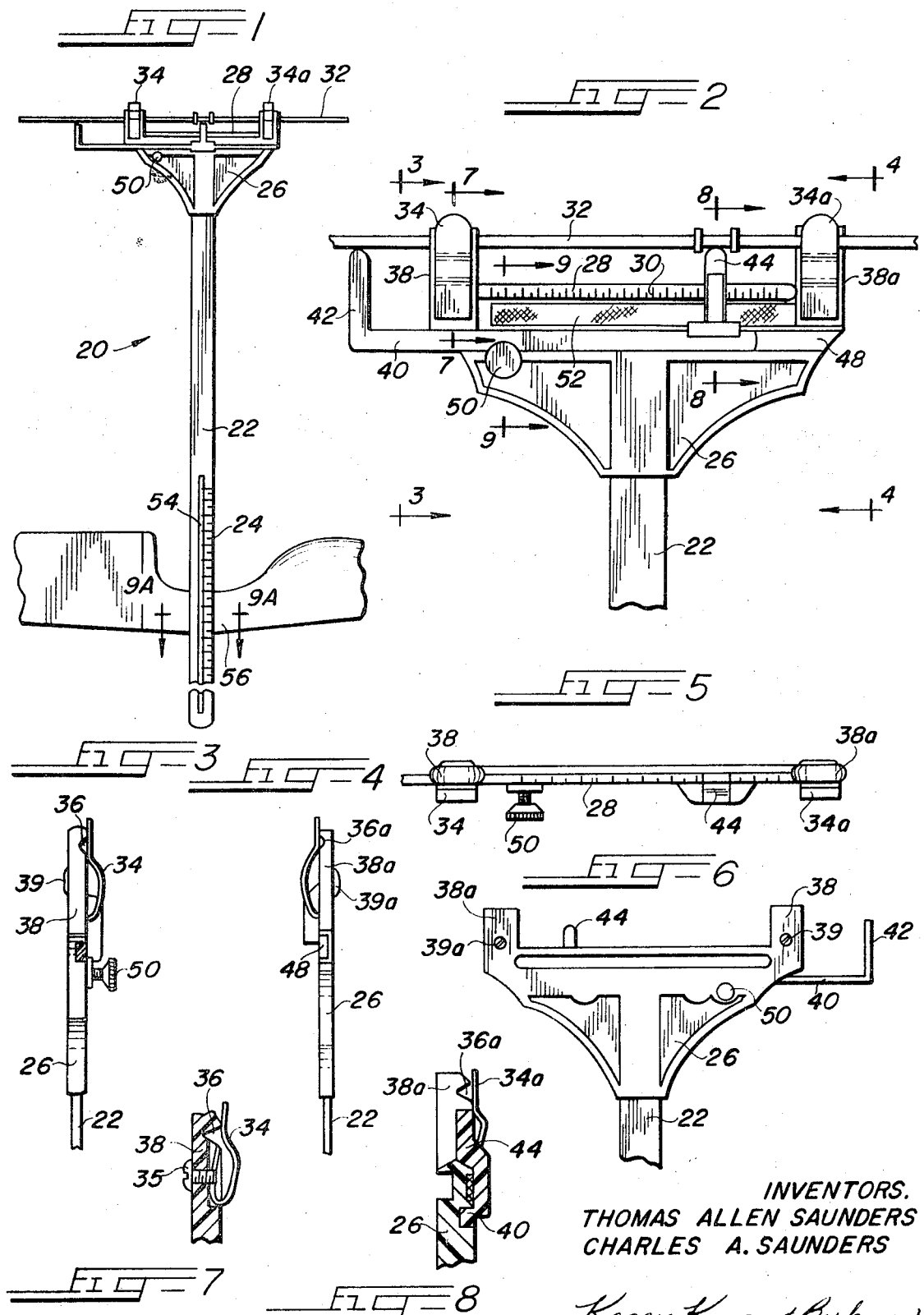
INVENTORS.
THOMAS ALLEN SAUNDERS
CHARLES A. SAUNDERS
BY Kegan, Kegan & Birkman
ATTYS

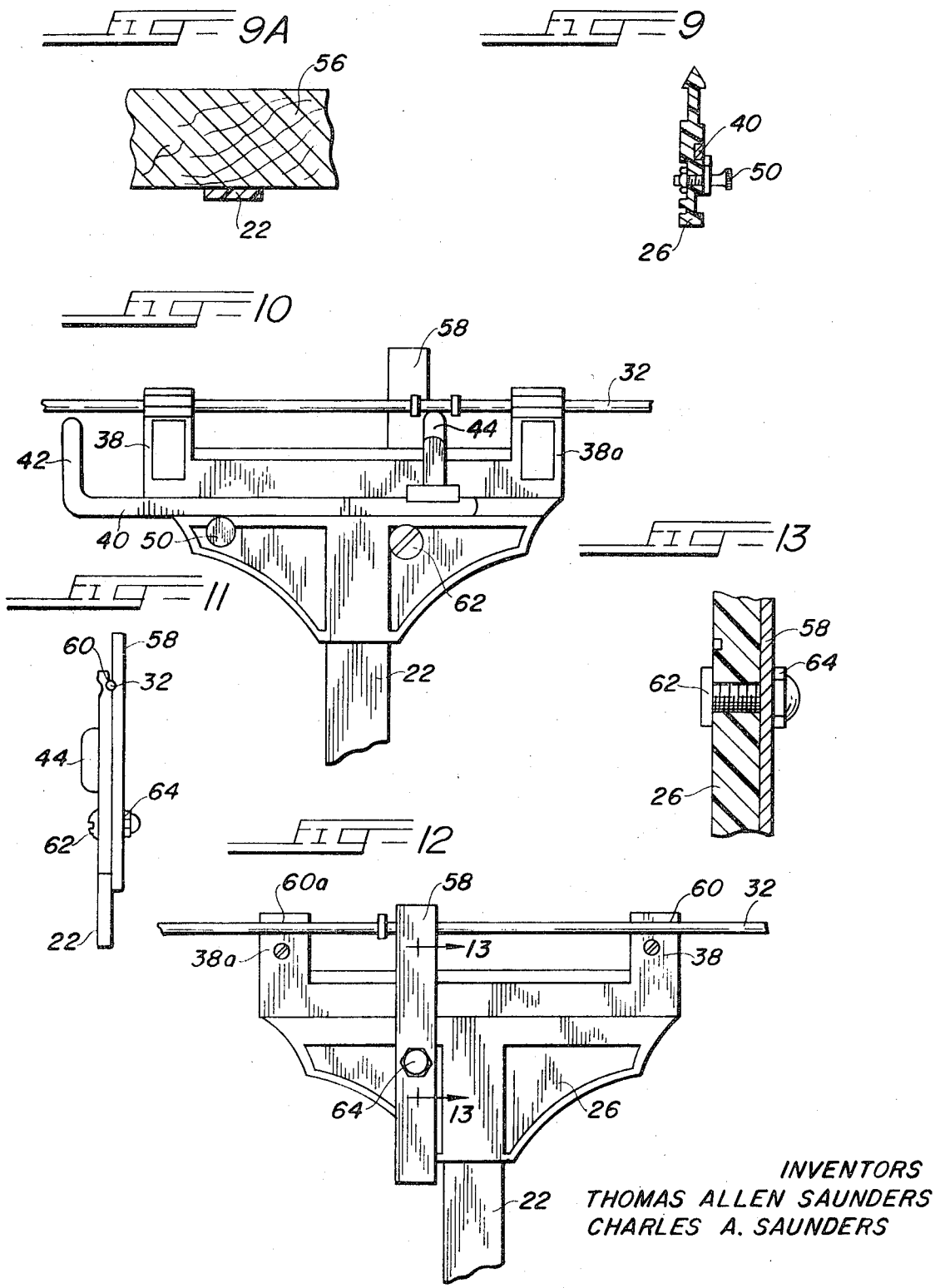

BOW CHECKING AND CALIBRATING DEVICE

This invention relates generally to archery equipment. More specifically, it relates to a bow square for adjusting and checking the bracing height of a bow string, and for locating the nocking point on the bow string.

The accuracy of a bow is significantly dependent upon proper stringing of the bow. The distance between the inside of the bow handle and the string is known as the "bracing height" or the "fistmehl." The point of the bow string at which the arrow is placed so that each arrow is always shot from the same position with respect to the string is known as the "nocking point."

It is an object of this invention to provide an apparatus for adjusting and checking the bracing height of a bowstring and for locating the nocking point thereon. It is another object of this invention to provide an apparatus which can be marked with indications of the optimum adjustments of the bracing height and nocking point for a particular bow or bows so that these adjustments can be checked quickly and accurately in the field.

It is a further object of the invention to provide an apparatus, which may also be used quickly and accurately to check the location of the bow string of a "peep sight" or a "kisser."

An important feature of this invention is means for recording and maintaining an accurate record of the proper adjustment of the bracing height, and the locations of the nocking point, the kisser and the peep sight so that tedious measurement is not required each time these adjustments are checked.

These, and other objects, features and advantages of the invention will become apparent from the following description and the drawings in which:

FIG. 1 is a side elevational view of the bow square apparatus mounted on a bow for checking the bracing height and the knocking point;

FIG. 2 is an enlarged, side elevational view of the bow square head clipped onto a bowstring;

FIG. 3 is a edge view of the bow square head taken along line 3-3 of FIG. 2 and showing means for securing the bow square to the bow;

FIG. 4 is a edge view of the apparatus as seen from a position opposite that shown in FIG. 3 taken along line 4—4 of FIG. 2;

FIG. 5 is a top plan view of the bow square head showing the upper edge thereof;

FIG. 6 is a side elevational view of the bow square head showing the side opposite that shown in FIG. 2;

FIG. 7 is a cross sectional view of the spring clip and string receiving groove taken along line 7—7 of FIG. 2;

FIG. 8 is a cross sectional view of a portion of the bow square head taken along lines 8—8 of FIG. 2 and showing the details of the pointer and slide mechanism;

FIG. 9 is a cross sectional view of the bow square head taken along line 9—9 of FIG. 2;

FIG. 9A is an end view taken along lines 9A—9A of FIG. 1 and showing the bar of the bow square abutted against the bow handle;

FIG. 10 is a side elevational view of a second embodiment of the head of the bow square showing an alternative means for clipping it to the bowstring;

FIG. 11 is an edge view of the bow square head or cross bar shown in FIG. 10;

FIG. 12 is a side elevational view showing the opposite side of the bow square head shown in FIG. 10; and FIG. 13 is a cross sectional view taken along lines 13—13 of FIG. 12 and showing the bolt for fastening the string retaining plate of the bow square head or cross bar.

Referring more specifically to the drawings, there is shown in FIGS. 1, 2 and 3 a bow square 20 having a bar or elongated plate 22 marked with a scale 24 graduated in inches. The bar 22 is affixed to a bow square head or cross bar 26 which has a marginal, linear edge or edge portion 28 bearing scale markings 30. The cross bar 26 is clipped to a bow string 32 by means of metal spring clips 34 and 34a. The bow string 32 is held in bow string receiving grooves 36 and 36a which are cut in flanges 38 and 38a on each end of the linear edge portion 28 of the cross bar 26. The bow square 20 may easily be clipped to the bow string 32 so that the string 32 is generally parallel to and spaced from the edge 28, and the bar 22 is at a generally right angle to the bow handle 56. An indicator slide 40 having a handle 42 and a pointer 44 is mounted in a slot 48 in the cross bar 26, which slot 48 parallels the linear edge 28. The slide 40 may be moved within the slot 48 to locate the pointer 44 at any desired position along the edge 28. A thumbscrew 50 mounted on the cross bar 26 at a point just below the slidable bar 40 operates to lock the slide 40 and pointer 44 in any desired position along the scale 30.

A nocking point marking accepting surface 52 is formed on or carried by the cross bar 26 so as to extend parallel to the scale 30. The marking accepting surface 52 may be a roughened surface or may consist of a strip of adhesive tape or similar material which may be easily marked with a pen or pencil. A similar bracing height marking accepting surface 54 is provided to extend parallel to the scale 24 on the elongated plate 22.

The bow checking device is used to find the bracing height by engaging the bowstring 32 in the grooves 36 and 36a of flanges 38 and 38a. In the embodiment of the invention illustrated in FIG. 2, the string 32 is held in said grooves 36 and 36a by means of metal spring clips 34 and 34a fastened to flanges 38 38a, respectively, by means of screws 39 and 39a. The distance from the string 32 to the bow handle 56 is indicated on the scale 24. Once the optimum bracing height is found, the bracing height marking accepting surface 54 is marked by means of a pen, pencil or other markers so that the desired bracing height may be readily located without further reference to the scale 24.

The nocking point is recorded by loosening the thumbscrew 50 and sliding the bar 40 in groove 48 to position the pointer 44 opposite the selected nocking point. The marking surface 52 is then marked to provide a permanent indication of the nocking point.

A kisser, or point on the bow string which is drawn to lips of the archer at full draw, may be located and recorded by moving the sliding bar 40 so that the handle or second pointer 42 touches the kisser. The marking surface 54 is then marked at the location of the pointer 44.

The apparatus may also be used to locate and record the position of a peep sight on the bowstring in the same manner as is done with a kisser.

A second embodiment of the invention, shown in FIGS. 10 through 13, utilizes a bowstring contacting plate 58 to stress the bowstring and seat it in a pair of bowstring receiving grooves 60 and 60a which are cut in the flanges 38 and 38a on the sides of said flanges opposite grooves 36 and 36a. A bolt 62 and nut 64 assembly holds the retaining plate 58 to the cross bar 26.

While this invention has been described with reference to preferred embodiments, it will be readily appreciated that various changes and modifications may be made, and it is intended to cover through the present application all such modifications which fall within the true spirit and scope of the appended claims.

What is claimed is:

1. In an archery bow checking and calibrating device for properly locating a nocking point on a bow string and for measuring and adjusting the distance between the bow string and the bow handle of an archery bow to enhance precision and accuracy in shooting, said device constituting a bow square and including, in combination, an elongated plate provided with indicia means defining a graduated scale extending along at least a portion of the length of said plate, a cross bar fastened to and extending generally transversely of said plate at an end thereof, bow string engaging and clamping means carried by said cross bar and adapted slideably to grip the bow string and being shiftable therealong for selective positioning of said cross bar on the bow string, scale indicating means carried by said cross bar and extending along a linear path generally paralleling a bow string gripped by said bow string engaging and clamping means, the improvement comprising a slide carried by said cross bar and slidably shiftable along the length thereof, and pointer means affixed to said slide for reproducibly correlating placement of a nocking point on the bow string with said scale indicating means of said cross bar.

2. The improvement as set forth in claim 1 and further comprising a marking accepting surface generally paralleling said scale indicating means of said cross bar and adapted to receive visual markings to be applied at selectable positions therealong corresponding to scale positioning of said nocking point locating pointer carried by said slide, whereby positions selected for securement of said nocking point on the bow string may be accurately checked and reestablished from time-to-time, as required, to maintain desired bow adjustment and accuracy.

3. The improvement as set forth in claim 1 and further comprising a second pointer means carried by said slide and correlated with said scale indicating means, said second pointer means being shiftable to selectable positions along the bow string for reproducibly locating a kisser position on said bow string.

4. The improvement as set forth in claim 1 and further comprising a second pointer carried by said slide and correlated with said scale indicating means, said second pointer being shiftable to selectable positions along the bow string for reproducibly locating a peep sight position on said bow string.

5. The improvement as set forth in claim 1 and further comprising a marking accepting surface generally paralleling said indicia means along a portion of the length of said elongated plate and adapted to receive visual markings to be applied at selectable positions therealong corresponding to a desired distance between the bow string and the bow handle, whereby the desired distance between the bow string and the bow handle may be accurately checked and reestablished from time-to-time, as required, to maintain desired bow adjustment and accuracy.

* * * * *